United States Patent
Wang et al.

(10) Patent No.: US 6,748,138 B2
(45) Date of Patent: Jun. 8, 2004

(54) OPTICAL GRATING FABRICATION

(75) Inventors: David W. Wang, Saratoga, CA (US); John C. Tsai, Saratoga, CA (US)

(73) Assignee: Fibera, Inc., Santa Clara, CA (US)

( * ) Notice: Subject to any disclaimer, the term of this patent is extended or adjusted under 35 U.S.C. 154(b) by 143 days.

(21) Appl. No.: 09/953,468

(22) Filed: Sep. 14, 2001

(65) Prior Publication Data

US 2003/0053733 A1 Mar. 20, 2003

(51) Int. Cl.[7] ............................................... G02B 6/34
(52) U.S. Cl. ....................................................... 385/37
(58) Field of Search ........................... 385/37, 129–132; 359/566, 568–576

(56) References Cited

U.S. PATENT DOCUMENTS

| | | | |
|---|---|---|---|
| 4,474,427 A | | 10/1984 | Hill et al. |
| 4,725,110 A | | 2/1988 | Glenn et al. |
| 4,740,951 A | * | 4/1988 | Lizet et al. .................... 398/87 |
| 4,807,950 A | | 2/1989 | Glenn et al. |
| 4,852,960 A | * | 8/1989 | Alferness et al. ............. 385/37 |
| 5,029,981 A | * | 7/1991 | Thompson ................... 359/572 |
| 5,042,897 A | | 8/1991 | Meltz et al. |
| 5,048,913 A | | 9/1991 | Glenn et al. |
| 5,061,032 A | | 10/1991 | Meltz et al. |
| 5,104,209 A | | 4/1992 | Hill et al. |
| 5,216,739 A | | 6/1993 | Hill et al. |
| 5,367,588 A | | 11/1994 | Hill et al. |
| 5,388,173 A | | 2/1995 | Glenn |
| 5,495,548 A | | 2/1996 | Bilodeau et al. |
| 5,500,916 A | * | 3/1996 | Cirelli et al. .................. 385/37 |
| 5,652,818 A | | 7/1997 | Byron |
| 5,726,805 A | * | 3/1998 | Kaushik et al. .............. 359/589 |
| 5,822,479 A | | 10/1998 | Napier et al. |
| 5,898,804 A | | 4/1999 | Wickham |
| 6,023,354 A | * | 2/2000 | Goldstein et al. ............. 359/15 |
| 6,031,951 A | * | 2/2000 | Stiens .......................... 385/37 |
| 6,035,089 A | * | 3/2000 | Grann et al. ................. 385/129 |
| 6,084,998 A | | 7/2000 | Straayer |
| 6,101,302 A | * | 8/2000 | Park et al. ..................... 385/37 |
| 6,169,831 B1 | | 1/2001 | Adams et al. |
| 6,459,533 B1 | * | 10/2002 | Clapp et al. ................. 359/578 |
| 6,490,393 B1 | * | 12/2002 | Zhou ........................... 385/37 |
| 6,522,795 B1 | * | 2/2003 | Jordan et al. ................. 385/10 |

FOREIGN PATENT DOCUMENTS

EP   1028504 A1 * 8/2000 ............. H01S/5/12

OTHER PUBLICATIONS

"Fiber gratings: vendors braced for the ramp-up,", Apr. 2001, vol. 2 No. 3, *FiberSystems International,* pp. 53, 54, 56 (3 pages).

* cited by examiner

*Primary Examiner*—Akm Enayet Ullah
*Assistant Examiner*—Michelle R. Connelly-Cushwa
(74) *Attorney, Agent, or Firm*—Raymond E. Roberts; IPLO Intellectual Property Law Offices

(57) ABSTRACT

A process (400) to construct single- and multi-dimensional optical gratings (100, 800) of interlayers (110, 230, 310 808) of differing refractive index, either in or atop a non-fiber substrate material (104, 202, 302). The optical gratings (100, 800) may particularly be Bragg type gratings, and thus suitable for receiving a laser beam (102, 240, 802) and forming there from one or more reflected beam portions (118, 248, 810) having one or more narrow wavelengths and a passed beam portion (120, 250, 812) of other wavelengths.

24 Claims, 14 Drawing Sheets

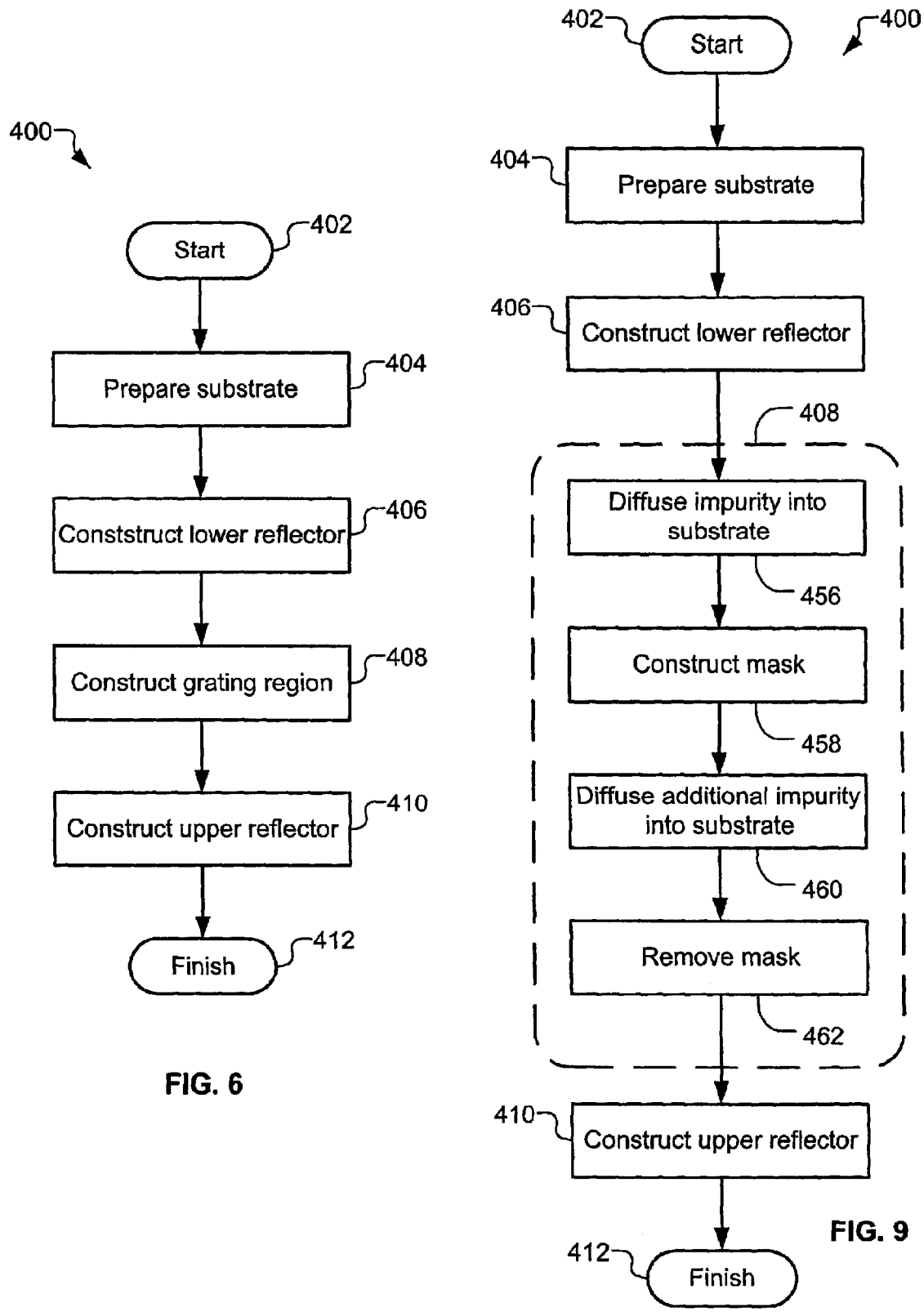

US 6,748,138 B2

OPTICAL GRATING FABRICATION

TECHNICAL FIELD

The present invention relates generally to optical gratings and more particularly to a method for making such gratings having an interlayer of differing refractive indexes.

BACKGROUND ART

Optical technology is progressing rapidly. Growing needs, particularly in the telecommunications industry, are driving this progress and there is currently a major impetus to improve existing optical systems and to develop new ones. Unfortunately, several major components still are not completely meeting manufacturing yield, field reliability, and operating capacity requirements. These failings have resulted in high costs in existing systems and are limiting the adoption of future systems. One such component is the optical grating, and particularly the fiber Bragg grating.

The common fiber Bragg grating is a periodic perturbation in the refractive index which runs lengthwise in a fiber waveguide's core. Based on the grating period, a Bragg grating reflects light within a narrow spectral band and transmits all other wavelengths which are present but outside that band. This makes Bragg gratings useful for light signal redirection, and one application where they are now being widely used is wavelength division multiplexing (WDM) in optical communications networks.

The typical fiber Bragg grating today is a germanium-doped optical fiber that has been exposed to ultraviolet (UV) light under a phase shift mask or grating pattern. The unmasked doped sections undergo a permanent change to a slightly higher refractive index after such exposure, resulting in an interlayer or a grating having two alternating different refractive indexes. This permits characteristic and useful partial reflection to then occur when a laser beam transmits through each interlayer. The reflected beam portions form a constructive interference pattern if the period of the exposed grating meets the condition:

$$2*\Lambda*n_{cff}=\lambda$$

where $\Lambda$ is the grating spacing, $n_{cff}$ is the relative index of refraction between the unchanged and the changed indexes, and $\lambda$ is the laser light wavelength.

FIG. 1 (background art) shows the structure of a conventional fiber Bragg grating 1 according to the prior art. A grating region 2 includes an interlayer 3 having two periodically alternating different refractive indexes. As a laser beam 4 passes through the interlayer 3 partial reflection occurs, in the characteristic manner described above, forming a reflected beam 5 and a passed beam 6. The reflected beam 5 thus produced will include a narrow range of wavelengths. For example, if the reflected beam 5 is that being worked with in an application, this separated narrow band of wavelengths may carry data which has been superimposed by modulation. The reflected beam 5 is stylistically shown in FIG. 1 as a plurality of parts with incidence angles purposely skewed to distinguish the reflected beam 5 from the laser beam 4.

Unfortunately, as already noted, conventional fiber Bragg gratings and the processes used to make them have a number of problems which it is desirable to overcome. For example, the fibers usually have to be exposed one-by-one, severely limiting mass-production. Specialized handling during manufacturing is generally necessary because the dosage of the UV exposure determines the quality of the grating produced. The orientation of the fiber is also critical, and best results are achieved when the fiber is oriented in exactly the same direction as the phase shift mask. The desired period of the Bragg grating will be deviated from if the fiber is not precisely aligned and accomplishing this, in turn, introduces mechanical problems. The way that the fiber work piece is held during manufacturing may produce stresses that can cause birefringes to form in the fiber and reduce the efficiency of the end product grating.

Once in use, conventional fiber Bragg gratings may also require special handling. The thermal expansion coefficient of the base optical fiber is often significant enough that changing environmental conditions can cause the fiber to either expand or shrink to the extent that the period of the grating and its center wavelength shift.

Accordingly, what is needed is an improved process for fabricating optical gratings, and particularly for the subset of optical gratings known as Bragg gratings.

DISCLOSURE OF INVENTION

Accordingly, it is an object of the present invention to provide improved processes to manufacture optical gratings.

And another object of the invention is to provide improved processes to manufacture Bragg type optical gratings.

Briefly, one preferred embodiment of the present invention is a method for fabricating an optical grating. The method includes providing a substrate, a layer of transmissive material, a first reflector below the layer of transmissive material, a grating region in the layer of transmissive material, and providing a second reflector above the layer of transmissive material.

An advantage of the present invention is that it provides improved processes to manufacture a variety of optical gratings, particularly including Bragg type optical gratings.

Another advantage of the invention is that it does not use fiber based media, thus eliminating a number of disadvantages in both fiber based manufacturing processes and fiber media based grating products.

Another advantage of the invention is that it may employ already well known and widely used manufacturing processes and materials, adopted from conventional electronic semiconductor integrated circuit (IC) and micro electromechanical system (MEMS) manufacturing. Highly desirable attributes of such processes may thus be imparted to the inventive processes and the products produced there with, including mass automated manufacturing, rigorous quality control, high yields, and low cost.

Another advantage of the invention is that it permits easy, very high integration with other products of conventional IC and MEMS manufacturing processes.

And another advantage of the invention is that it permits the manufacture of multidimensional gratings.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended figures of drawings in which:

FIGS. 3a–p are a series of views at different stages of manufacture of one embodiment of a Bragg grating according to the present invention, wherein:

FIG. 3a is a cross section side view of the Bragg grating as a substrate is prepared;

FIG. 3p is a cross section side view of the Bragg grating after a new transmissive layer is deposited;

FIGS. 4a–b are cross section side views depicting laser beams traveling through the finished Bragg grating of FIGS. 3a–p, wherein FIG. 4a shows how a beam will travel with minimum loss, and FIG. 4b shows how a beam will encounter constructive interference when the Bragg condition is met;

FIGS. 5a–b are cross section side views at different stages of manufacture of a second embodiment of a Bragg grating according to the present invention, wherein FIG. 5a shows the Bragg grating after impurities are diffused into a substrate, and FIG. 5b shows the Bragg grating after a mask has been applied and additional impurities diffused into the substrate;

FIG. 6 is a flow chart summarizing a process for creating the inventive Bragg grating;

FIG. 9 is a flow chart showing application of the process to create the embodiment of the Bragg grating of FIGS. 5a–b.

In the various figures of the drawings, like references are used to denote like or similar elements or steps.

BEST MODE FOR CARRYING OUT THE INVENTION

Figure 1:
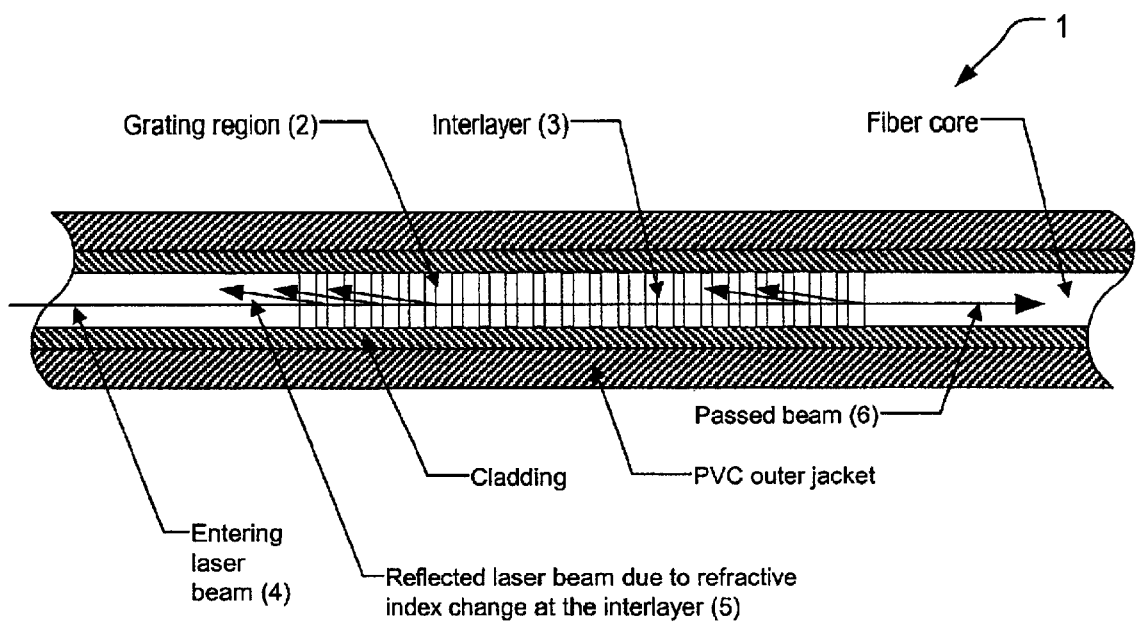
FIG. 1 (background art) is a cross sectional view of a conventional fiber Bragg grating, including a stylized depiction of a laser beam traveling through the Bragg grating.

A preferred embodiment of the present invention is a process for creating an optical grating. A single dimensional, basic narrow bandwidth Bragg grating is used as a primary example herein, but this example should not be interpreted as implying a limitation of the scope of the invention. For example, Bragg gratings are a specialized case of gratings as a species and simpler, general gratings are also well within the scope of the invention. Similarly, the principals of the invention are extendible to more complex gratings than the basic Bragg grating of the primary example. For instance, chirped Bragg gratings and other complex grating types. In particular, both single and multi-dimensional gratings are possible. Accordingly, once those skilled in the art grasp the implications of the invention as taught by the necessarily limited examples presented herein, the invention will be seen to be extendable in many straightforward manners. As illustrated in the various drawings herein, and particularly in the views of FIGS. 2 and 4, one preferred embodiment of the invention is depicted by the general reference character 400 and a product produced therewith is depicted by the general reference character 100.

This invention adopts semiconductor type micro fabrication processes to the production of optical gratings. Before turning to a detailed discussion of such processes, the following overview is provided as an introduction.

Figure 2:
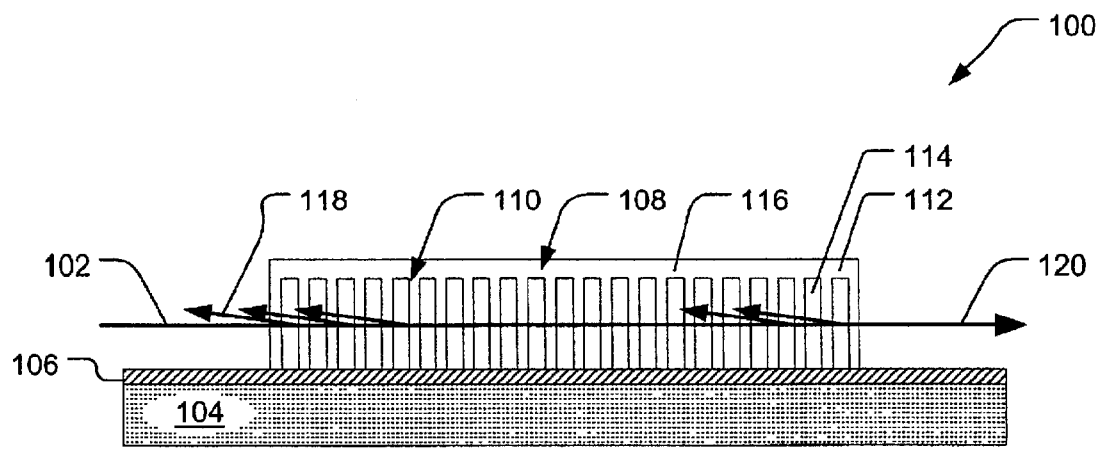
FIG. 2 is a cross sectional view of a Bragg grating manufactured according to the present invention, including a stylized depiction of a laser beam traveling through the Bragg grating.

FIG. 2 is a cross sectional view depicting a Bragg grating 100, according to the present invention, with a laser beam 102 stylistically represented as traveling through it. The inventive Bragg grating 100 includes a substrate 104, atop which the major operational elements have been constructed. The substrate 104 may be a material such as silicon wafer, glass plate, etc. A reflective layer 106 has been deposited atop the substrate 104. Suitable materials for this include inherently reflective ones, such as metallic coatings like gold, silver, or aluminum, as well as materials having a low refractive index relative to the refractive indexes of the materials in a grating region (described next).

A grating region 108 is provided atop the reflective layer 106. Various materials and manufacturing techniques may be used to construct this grating region 108 and, in fact, a substantial part of the following discussion covers such variations. For purposes of this introduction, the grating region 108 can be viewed simply as including an interlayer 110 of regions of a first transmissive material 112 and a second transmissive material 114. The first transmissive material 112 and second transmissive material 114 have different refractive indexes and are interspaced by one-quarter of the wavelength of light which the Bragg grating 100 will filter (or by an odd numbered multiple of one-quarter wavelength).

An over-fill layer 116 is provided atop the grating region 108. It may be a material having a low refractive index, relative to the refractive indexes of the other materials in the grating region 108, it may be additional of the transmissive materials 112, 114 (as is shown here), or it may be a metallic coating similar to the reflective layer 106 used for similar purposes below the grating region 108.

Operationally, the Bragg grating 100 receives the laser beam 102 in the manner shown in FIG. 2. [For simplified explanation, "laser beam" is used herein as a generic term to represent all suitable light beams. Although light from laser sources is today predominantly used in applications where the inventive Bragg grating 100 will be widely employed, those skilled in the art will readily appreciate that light from other sources may be used as well.] The reflective layer 106 serves to reflect strayed portions of the laser beam 102 back in the original direction. Similarly, the over-fill layer 116 also does this. Here the over-fill layer 116 is of the same material as the second transmissive material 114 and it reflects the laser beam 102 because its index of refraction is substantially higher than that of the surrounding air.

As the laser beam 102 passes through the interlayer 110 of the grating region 108 it encounters the boundaries between the first and second transmissive materials 112, 114. In particular, it encounters the respectively different refractive indexes there. Partial reflection then occurs as the laser beam 102 passes through each boundary, forming a reflected beam 118 and a passed beam 120. [The reflected beam 118 is stylistically shown in FIG. 2 as a plurality of parts with incidence angles purposely skewed to distinguish the reflected beam 118 from the laser beam 102.] The reflected beam 118 will include a narrow range of wavelengths, formed in the characteristic manner of the Bragg condition by constructive interference in the light that is reflected, and the passed beam 120 includes the light of other wavelengths that were also present in the laser beam 102.

Figure 3A:
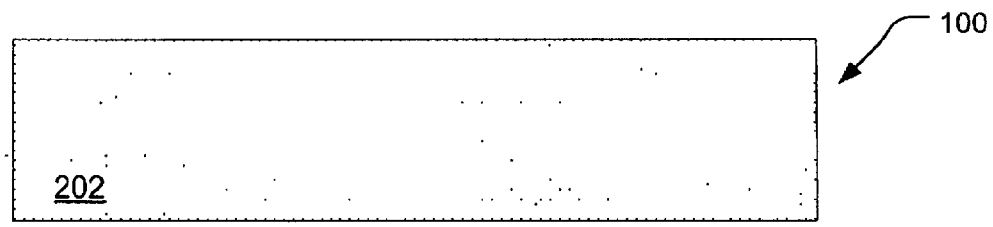
Figure 3B:
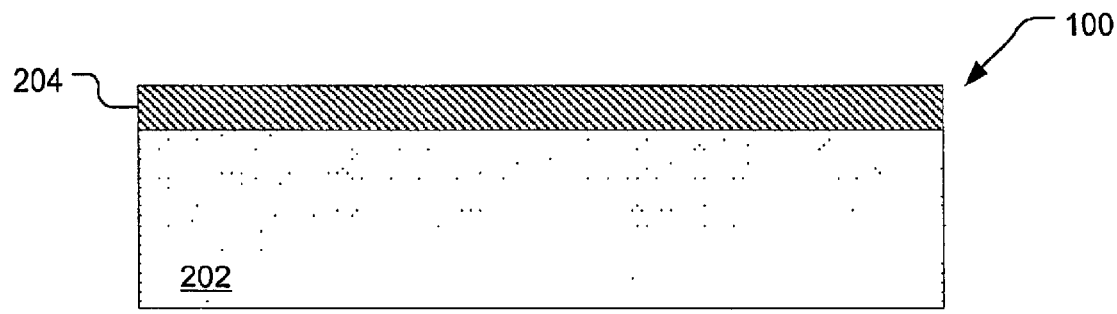
FIG. 3b is a cross section side view of the Bragg grating as a layer of photoresist is deposited.
Figure 3C:
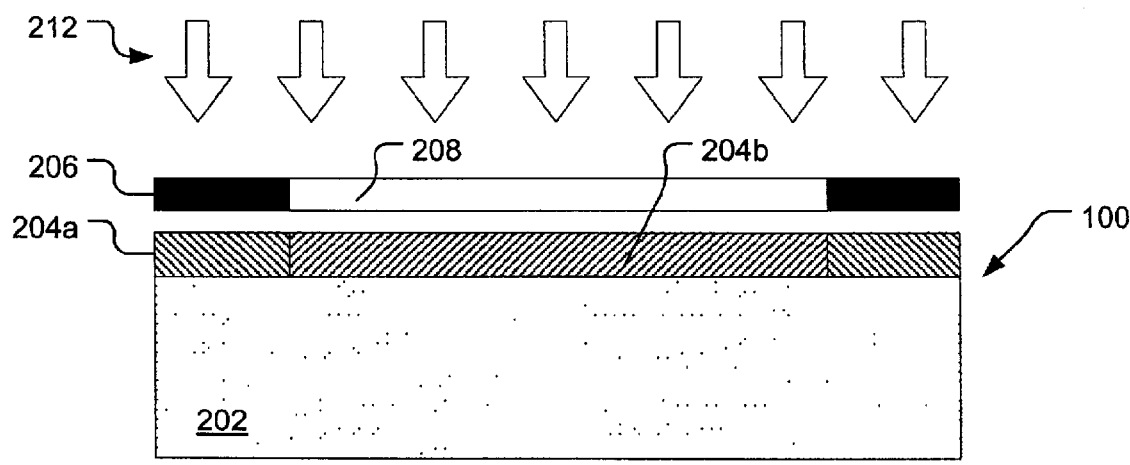
FIG. 3c is a cross section side view of the Bragg grating as it is exposed under a pattern.
Figure 3D:
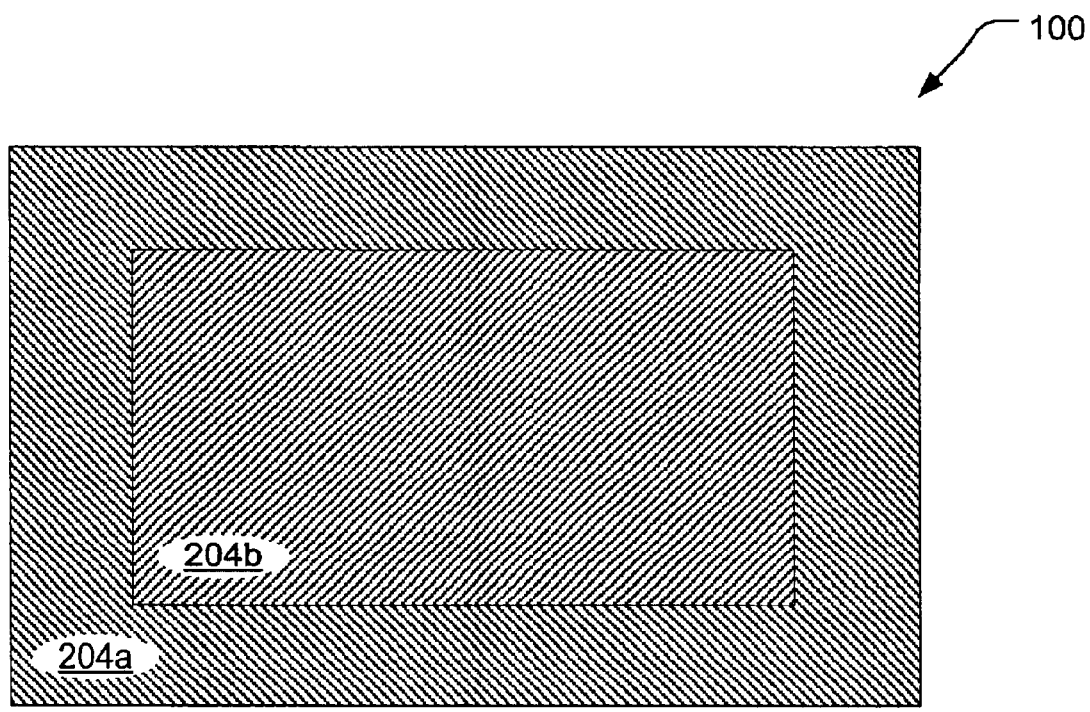
FIG. 3d is a top plan view of the Bragg grating after it is exposed.
Figure 3E:
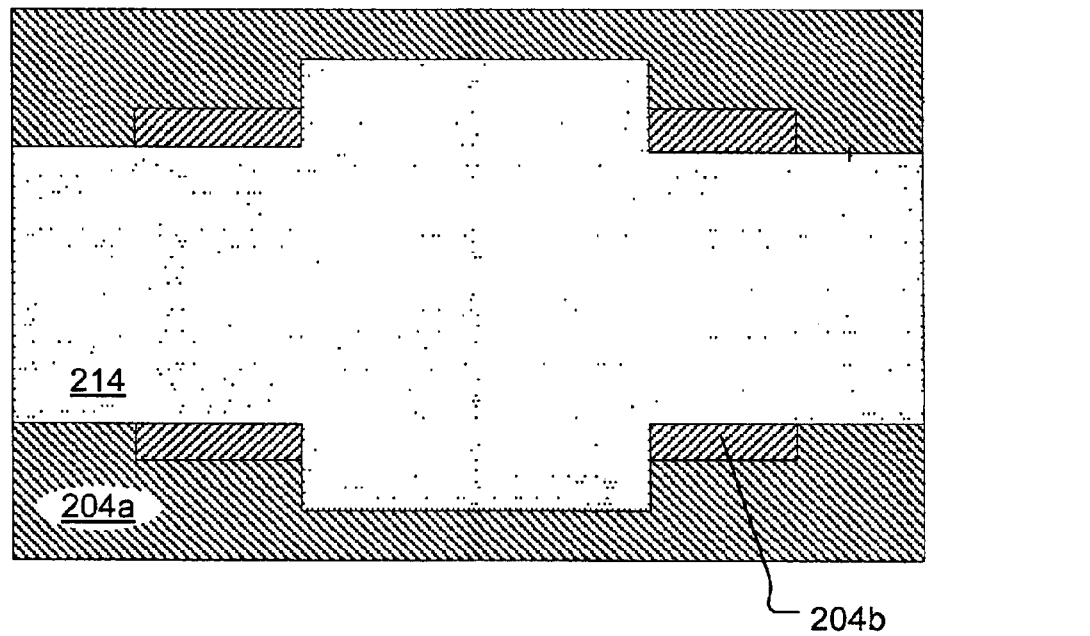
FIG. 3e is a top plan view of the Bragg grating after a transmissive layer is deposited.
Figure 3F:
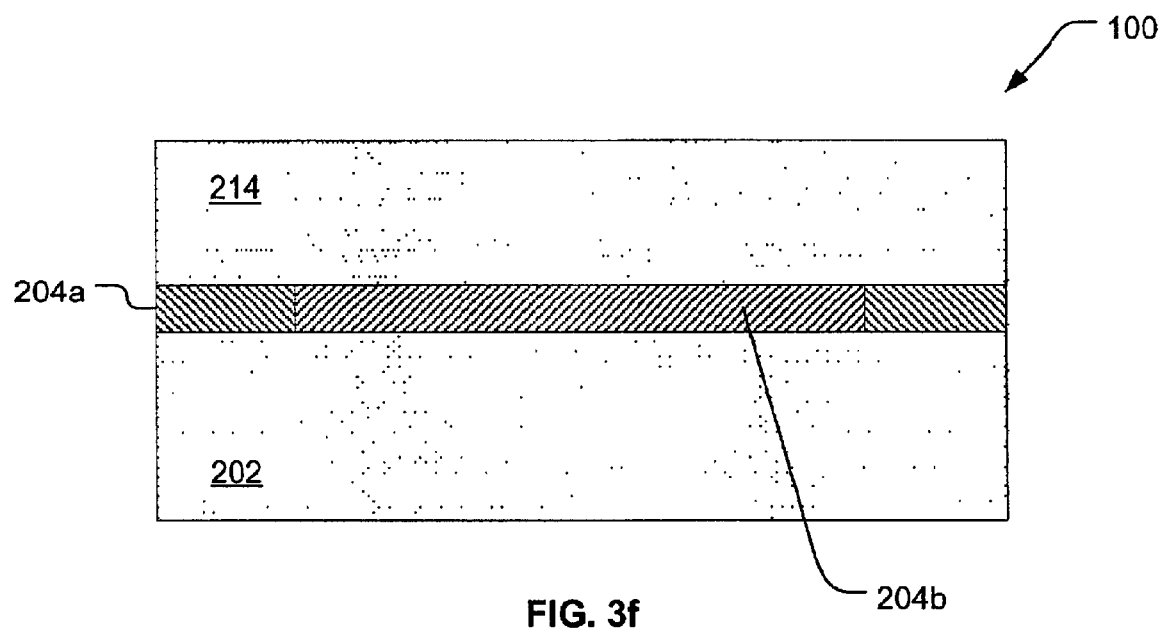
FIG. 3f is a cross section side view of the Bragg grating at the stage in FIG. 3e.
Figure 3G:
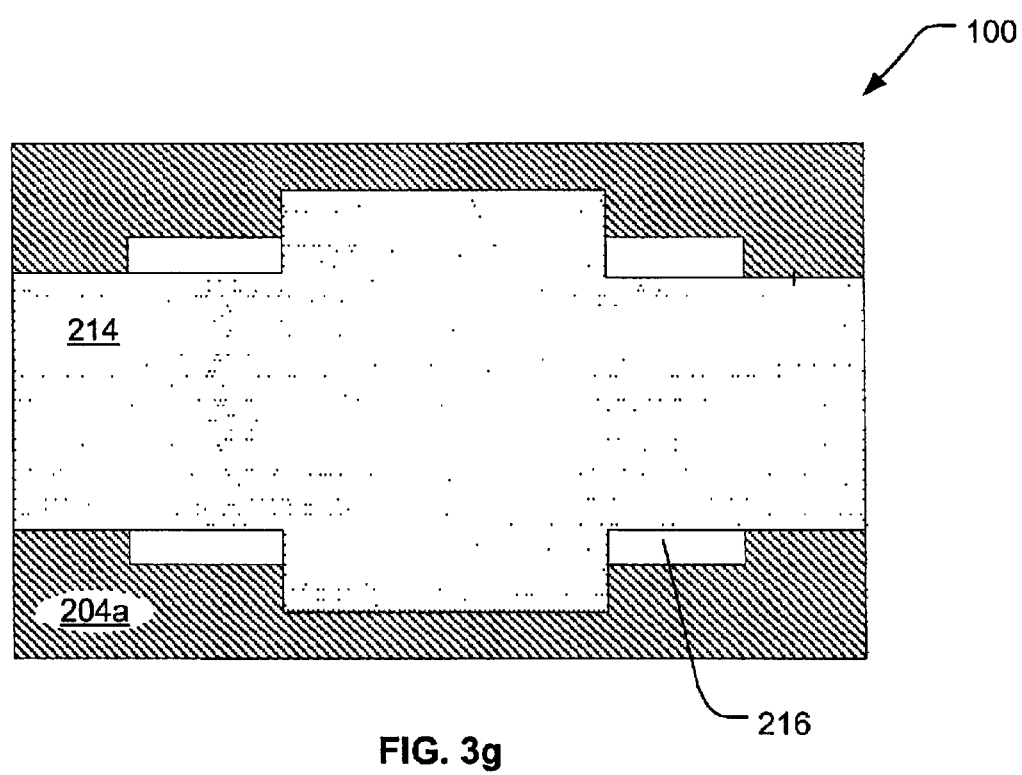
FIG. 3g is a top plan view of the Bragg grating after the exposed photoresist is removed.
Figure 3H:
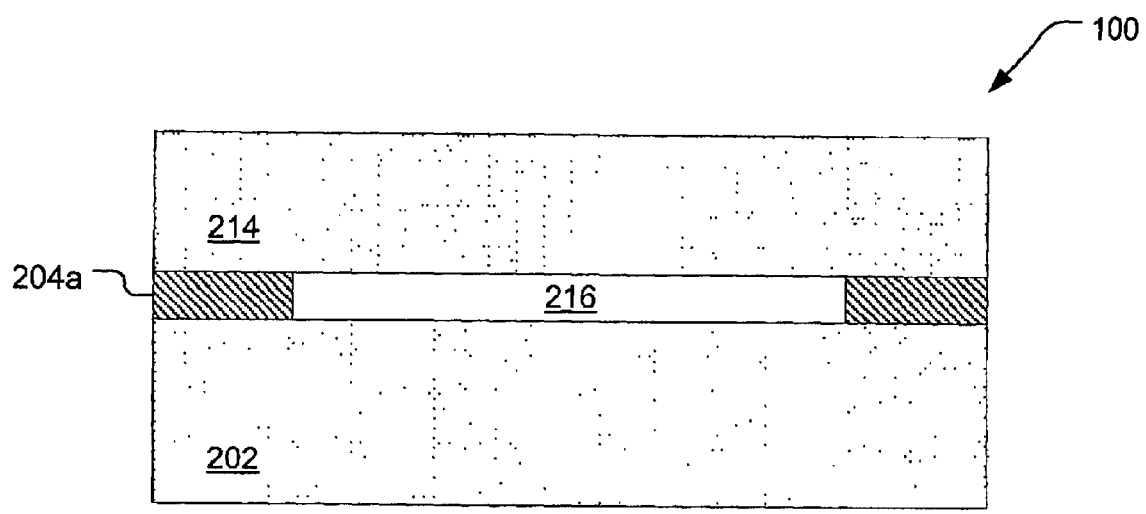
FIG. 3h is a cross section side view of the Bragg grating at the stage in FIG. 3g.
Figure 3I:
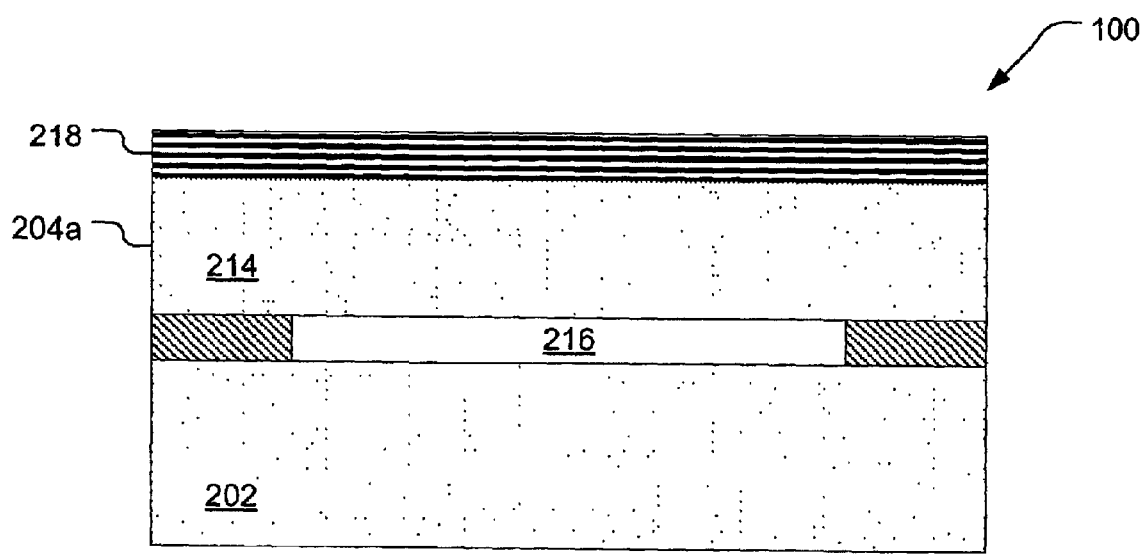
FIG. 3i is a cross section side view of the Bragg grating after a new layer of photoresist is deposited.
Figure 3J:
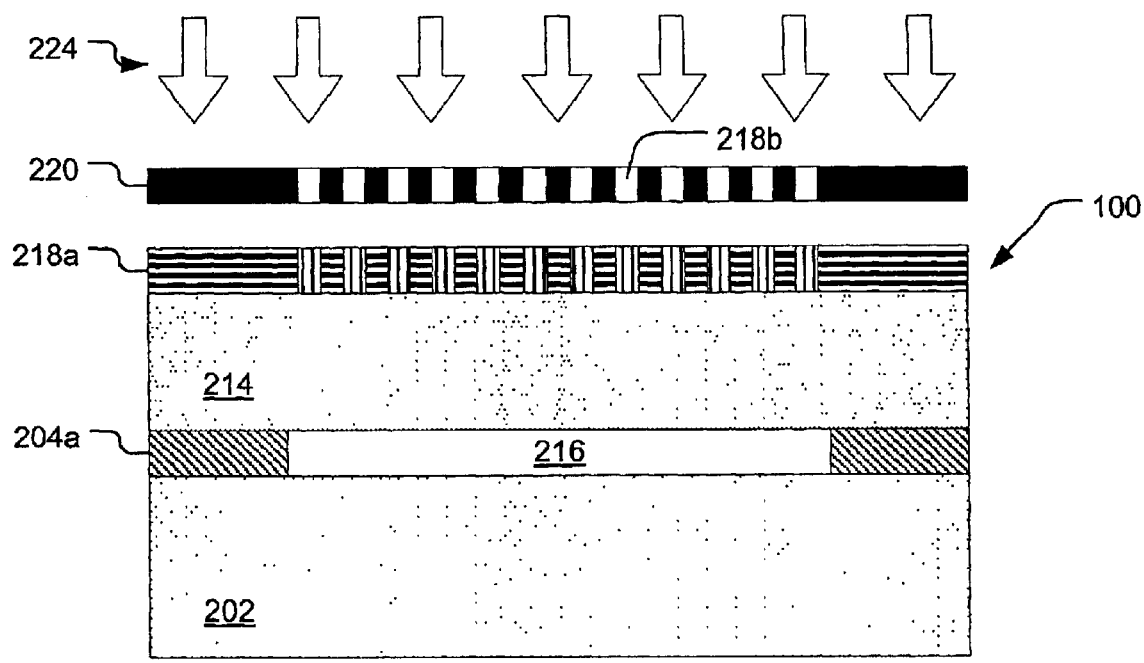
FIG. 3j is a cross section side view of the Bragg grating as it is exposed under a pattern.
Figure 3K:
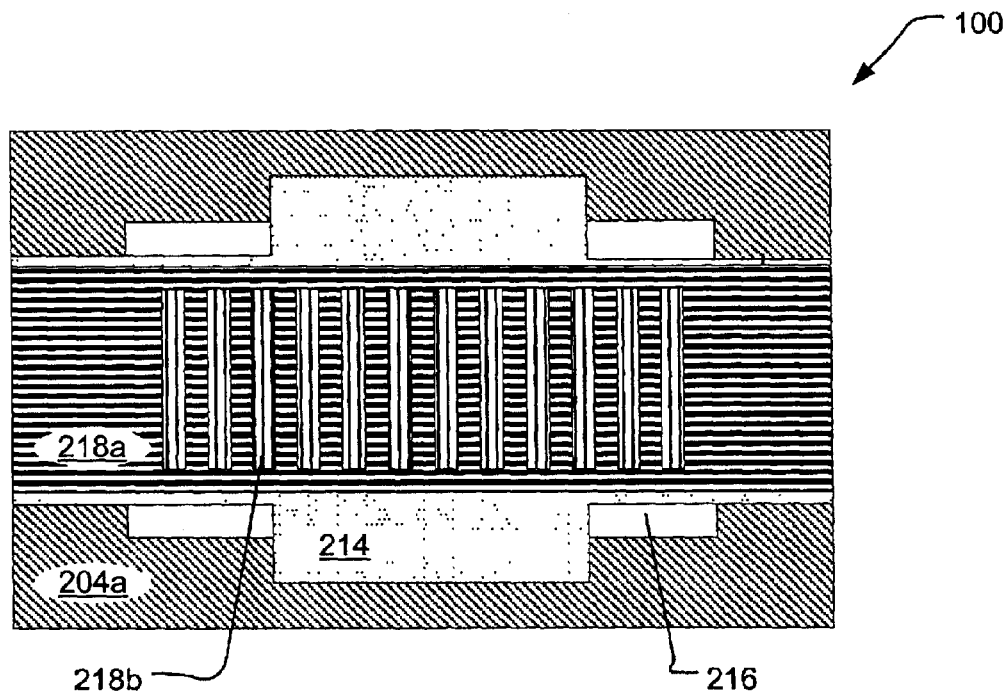
FIG. 3k is a top plan view of the Bragg grating after it is exposed.
Figure 3L:
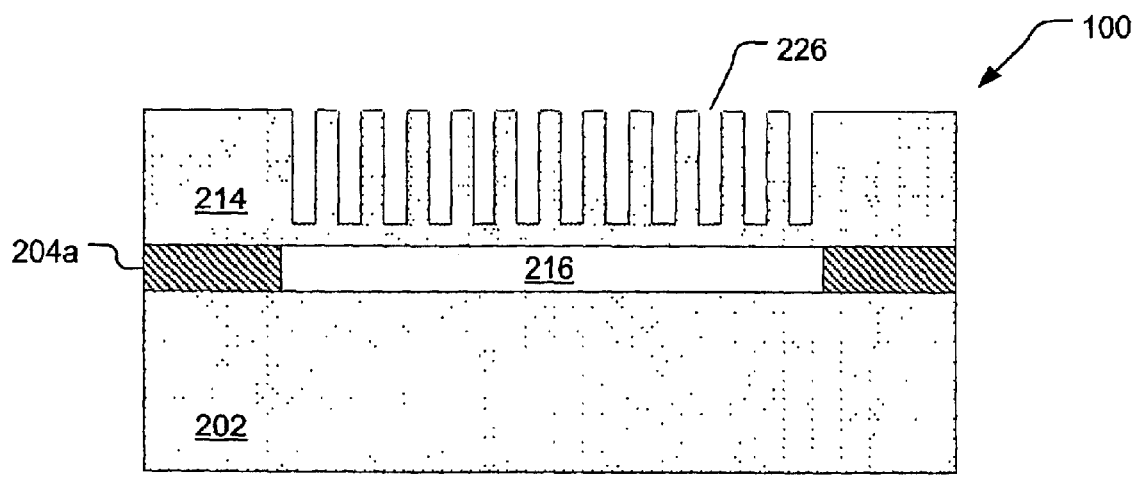
FIG. 3l is a cross section side view of the Bragg grating after the exposed photoresist and portions of the layer below are removed.
Figure 3M:
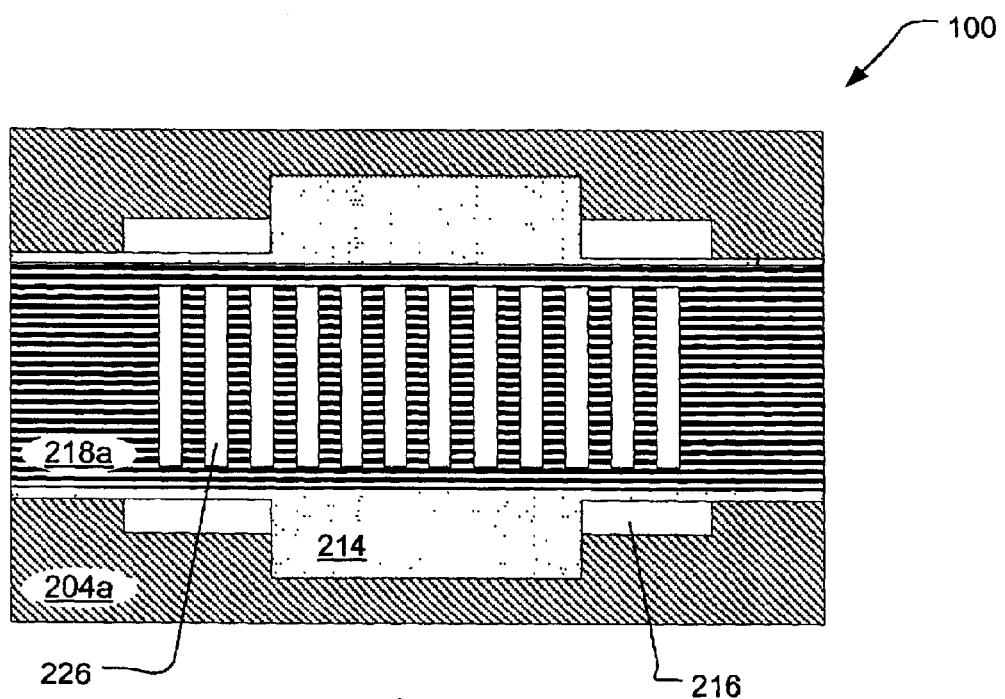
FIG. 3m is a top plan view of the Bragg grating at the stage in FIG. 3l.
Figure 3N:
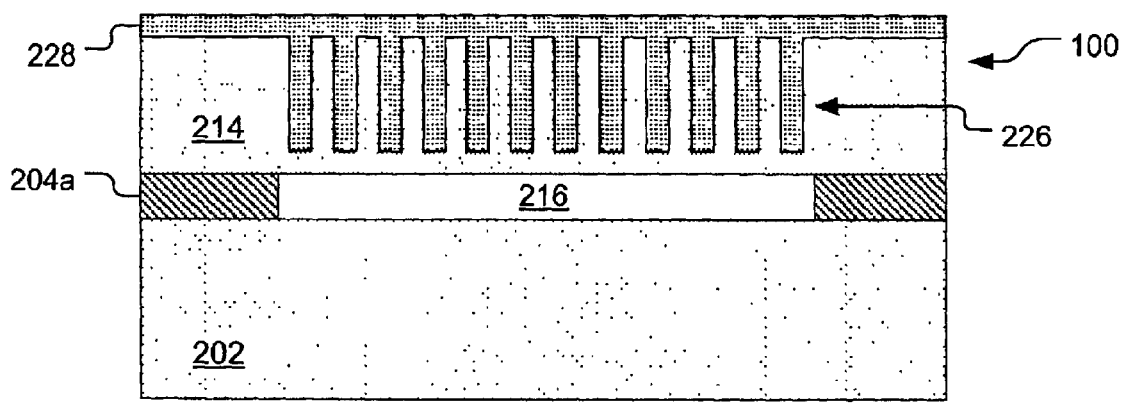
FIG. 3n is a cross section side view of the Bragg grating after a material having a different refractive index than the transmissive layer is deposited.
Figure 3O:
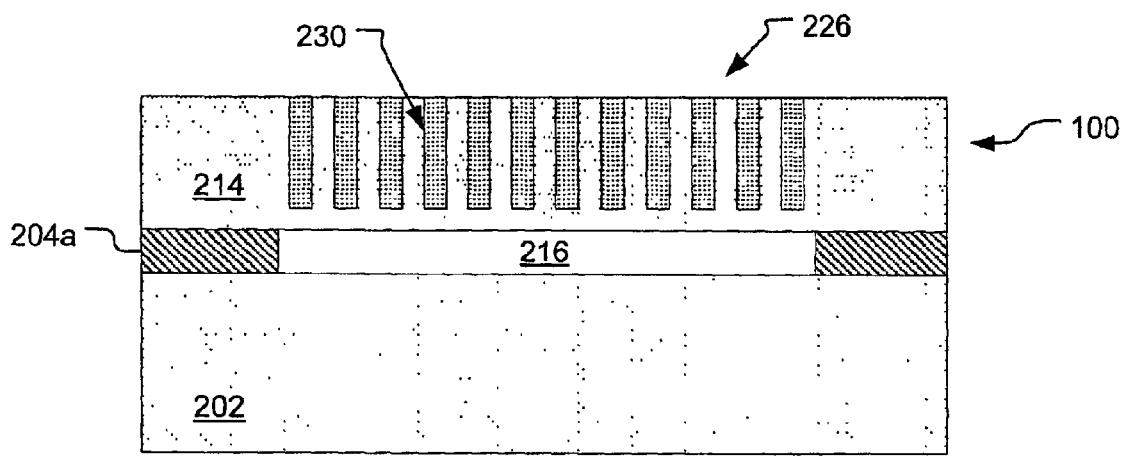
FIG. 3o is a cross section side view of the Bragg grating after excess material is removed.
Figure 3P:
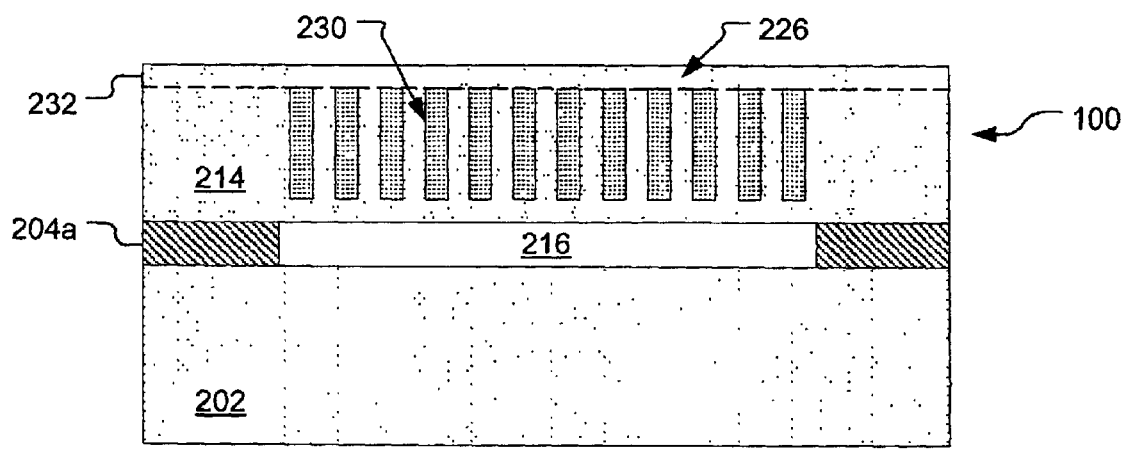

FIGS. 3a–p are a series of views at different stages of manufacture of one of a presently preferred embodiments of the Bragg grating 100. FIG. 3a is a side view of a substrate 202. As already noted, the substrate is of a suitable material upon which the major operational elements are constructed. At this initial stage the substrate 202 is essentially homogeneous. FIG. 3b is a side view after a photoresist layer 204 has been deposited atop the substrate 202.

FIG. 3c is a side view as the Bragg grating 100 is exposed. A photomask 206 having a pre-designated pattern 208 is provided and the Bragg grating 100 is exposed through it to light 212 which is appropriate for causing a photochemical reaction in the photoresist layer 204. This produces an unexposed region 204a and an exposed region 204b. FIG. 3d is a top view of the Bragg grating 100 after exposure, particularly depicting the unexposed region 204a and the exposed region 204b. Typically these would be termed to now have negative resist and positive resist, respectively.

FIG. 3e is a top view of the Bragg grating 100 after a transmissive layer 214 is deposited. As can be seen, some of the unexposed region 204a and some of the exposed region 204b of the photoresist layer 204 are left uncovered at this stage. FIG. 3f is a side view at this stage. The transmissive layer 214 has a thickness exceeding the height of light beams with which the Bragg grating 100 will later be used. In the inventor's presently preferred embodiment SiO2 is used for the transmissive layer 214. This material is easily "worked" as needed and its refractive index, of nominally 1.52, is also good. Many other materials may also be used, however. Without limitation, other suitable candidates which are widely used industrially are Al2O3, with a refractive index of 1.63, and MgF2, with a refractive index of 1.38. [Still other candidates include B, P, ZnSe, ZnS, GaP, SrTiO3, Si, Ge, InSb, YSZ, AlAs, BaTiO3, BiSiO20, Bi12GeO20, AlN, BN, AgGaS2, LiTaO3, CuCaS2, TlI, TlCl, TlBr, AgCl, AgBr, AgI, AgGaSe2, KnbO3, and even some organic materials.]

The unexposed region 204a remains once the exposed region 204b is removed (via any of various conventional means, chemical etching, dry etch techniques, subliming by baking, etc.). FIG. 3g is a top plan view and FIG. 3h is a side view of the Bragg grating 100 after removal. As can particularly be seen in FIG. 3h, removing the exposed region 204b leaves an air gap 216 between the substrate 202 and the transmissive layer 214. [Note, the "air gap" here may ultimately contain any gas present in the environment surrounding the Bragg grating 100. The inert gasses, N2, CO2, air, other gas mixtures, etc. are examples of gases commonly used in electronic equipment today. For that matter, the "air gap" can even be a vacuum. As will be seen in the operational discussion, below, the index of refraction of the air gap is what is key, and not what fills it.]

FIG. 3i is a side view of the Bragg grating 100 after a new photoresist layer 218 has been deposited, and FIG. 3j is a side view as it is exposed. A photomask 220 having a grating pattern 222 is here provided and the Bragg grating 100 is exposed through it to light 224. This produces an unexposed region 218a and a plurality of exposed regions 218b. FIG. 3k is a top view of the Bragg grating 100 after it is exposed in this manner, particularly showing the unexposed region 218a and the exposed regions 218b.

FIG. 3l is a side view of the Bragg grating 100 after the exposed regions 218b of the photoresist layer 218 and portions of the transmissive layer 214 below it have been removed. In FIG. 3l the unexposed region 218a is also shown as having already been removed. A key point to note, for this manufacturing variation, is that portions of the transmissive layer 214 are not removed so deeply that the air gap 216 is reached. The reason for this is provided in an operational discussion, below. FIG. 3m is a top view of the Bragg grating 100 at this stage. From FIG. 3l and FIG. 3m it can be appreciated that an array of open trenches now defines the grating region 226 in the transmissive layer 214.

FIG. 3n is a side view of the Bragg grating 100 after an over-fill layer 228 is deposited into the array of trenches. The over-fill layer 228 is of a material having a slightly different refractive index than the transmissive layer 214, and it fills in the openings grating region 226 so that a linearly extending interlayer array 230 is formed. The material of the over-fill layer 228 may be one of the same set of candidate materials for the transmissive layer 214, e.g., Si, SiO2, Al2O3, MgF2, etc., but it will either be of a different such material or, if the same, it will be treated to achieve a different refractive index.

FIG. 3o is a side view of the Bragg grating after excess material from the over-fill layer 228 has been removed. One process suitable for this is polishing. The unexposed region 218a was shown as having been already removed in FIG. 3l, but it could alternately have been left, the over-fill layer 228 applied atop it, and then it and the excess from the over-fill layer 228 removed together. In some manufacturing scenarios this is a matter of mere choice, but in others there may be an incentive to remove the over-fill layer 228 earlier. For instance, in common semiconductor fabrication processes organic photoresist materials are used. These are generally suitable for use here as well, but with early removal desirable to avoid contaminating the over-fill layer 228 as it is later applied.

Finally, FIG. 3p is a side view of the Bragg grating 100 after a new transmissive layer 232 is deposited. In this embodiment the inventors prefer that the transmissive layer 214 and the transmissive layer 232 have the same refractive index, and thus that they be of the same material This is not a requirement, however. The transmissive layer 232 may, for instance, be of the same material and have the same refractive index as the over-fill layer 228. As will become more clear in the discussion below, it is desirable that the over-fill layer 228 have a refractive index substantially different than that of air (refractive index=1). Thus a material like, say, MgF2 with a refractive index of 1.38, may be quite suitable for use in the over-fill layer 228 but not in the transmissive layer 232. This completes construction of the Bragg grating 100.

Figure 4A:
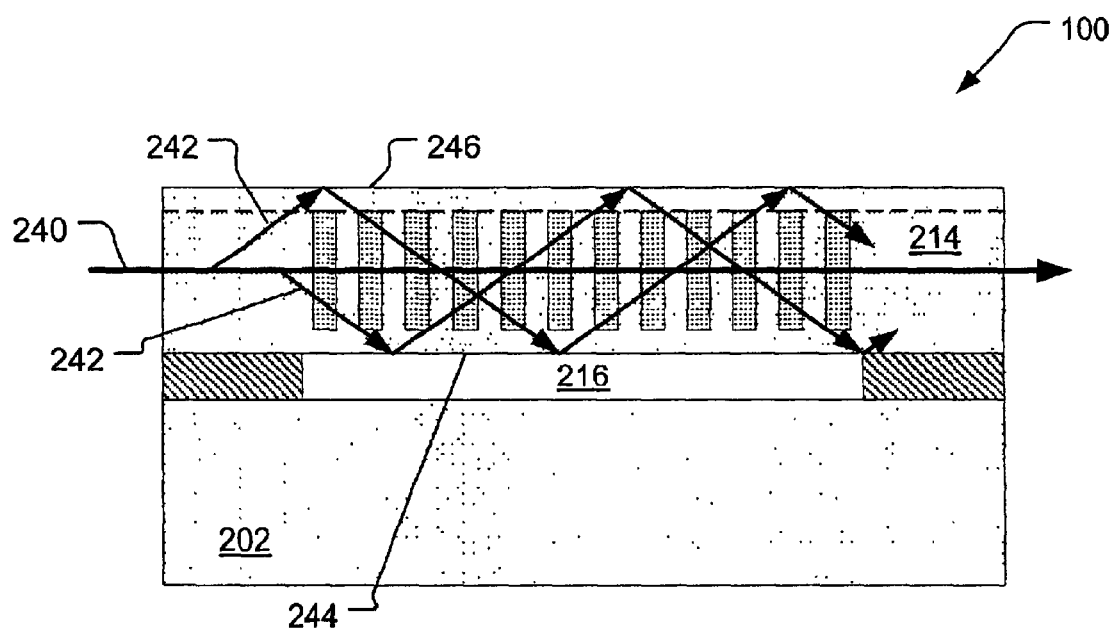
Figure 4B:
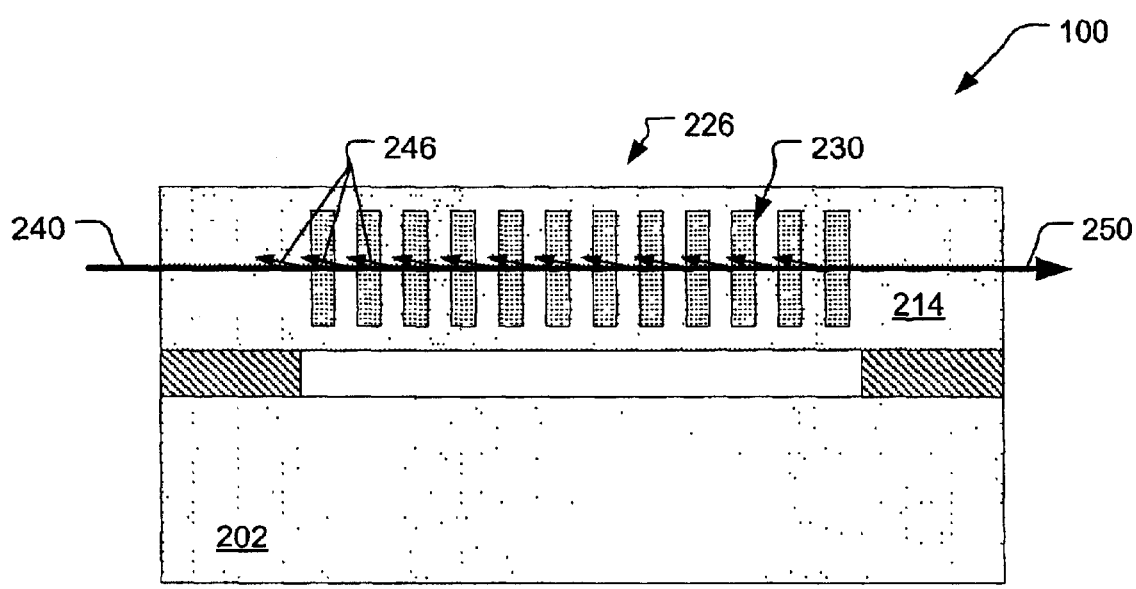

FIGS. 4a–b are cross section side views depicting a light beam 240 traveling through the finished Bragg grating 100 of FIGS. 3a–p. In FIG. 4a the light beam 240 has strayed portions 242, some of which go upward and others of which go downward. The downward traveling of the strayed portions 242 encounter an interface 244 at the juncture of the transmissive layer 214 and the air gap 216, and are reflected back into the transmissive layer 214. Similarly, the upward traveling of the strayed portions 242 encounter an interface 246 at the juncture of the transmissive layer 232 and the air above the Bragg grating 100, and are reflected back into the transmissive layer 232. Thus the interface 244 created at the air gap 216, and the disparity between the refractive indexes, is used to achieve reflection. This is structurally different than the embodiment of FIG. 2, where the reflective layer 106 was deposited below the grating region 108, but it is functionally equivalent. The light beam 240 is thus here also able to travel through the Bragg grating 100 with minimum power loss.

FIG. 4b shows how the main portion of the light beam 240 encounters the interlayer array 230 in the grating region 226, how a reflected portion 248 (stylistically shown here also as a plurality of parts with purposely skewed incidence angles) is created, and how a passed portion 250 is passed. The reflected portion 248 will include a narrow range of wavelengths, formed by constructive interference, and the passed portion 250 will include the light of other wavelengths that are also present in the light beam 240.

Figure 5A:
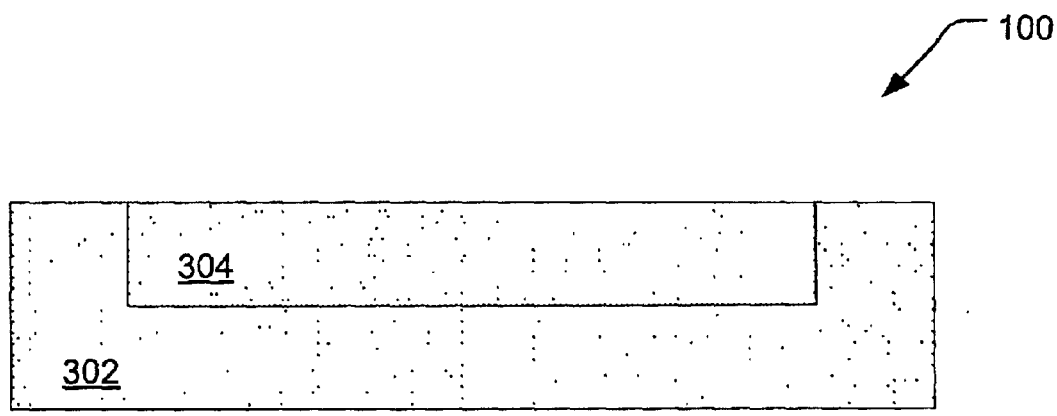
Figure 5B:
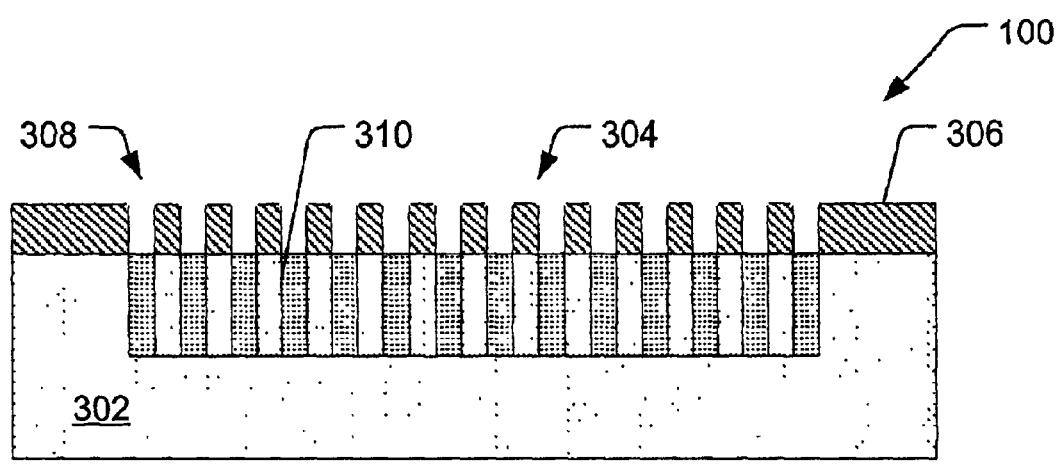

FIGS. 5a–b are side views at different stages of manufacture of a second embodiment of a Bragg grating 100 according to the present invention. FIG. 5a shows the Bragg grating 100 in an early stage of manufacture, after a substrate 302 has had impurities diffused into a grating region 304. FIG. 5b shows the Bragg grating 100 in a later stage of manufacture, after a mask 306 having a suitable open grating pattern 308 has been applied and additional impurities have been diffused into the grating region 304 below the openings in the grating pattern 308 to form a linearly extending interlayer array 310. The Bragg grating 100 here can then be finished, in straightforward manner, by removing the mask 306 and applying an over-fill layer (not shown).

This approach employs the fact that the refractive indexes for certain materials will change when impurities are diffused into them. One well known example is silicon: the refractive index for pure silicon is 3.5 but reduces to as low as 2.1 when a heavy dosage of. hydrogen is diffused into it. The refractive index can further be reduced to even lower than 1.5 by incorporating different levels of oxygen. Another example material is silica (SiO2): when it's diffused with germanium and under exposure of UV light its refractive index increases slightly. The inventive Bragg grating 100 depicted in FIGS. 5a–b can thus take advantage of these properties to obtain the desired characteristics in the interlayer array 310.

FIG. 6 is a flow chart summarizing a process 400 for creating the inventive Bragg grating 100. The process 400 starts in a step 402, where basic and conventional set up operations can be performed, as needed and as desired.

In a step 404 a substrate is provided and prepared. This serves as the basis of a workpiece for the rest of the process 400 and for construction of the Bragg grating 100.

In a step 406 a lower reflective means is constructed.

In a step 408 a grating region having an interlayer is constructed.

In a step 410 an upper reflective means is constructed.

Finally, in a step 412 the process 400 ends. This is where basic and conventional wrap up operations can be performed, as needed and as desired. The process 400, which in deed has been described very generally, is now finished.

Figure 7:
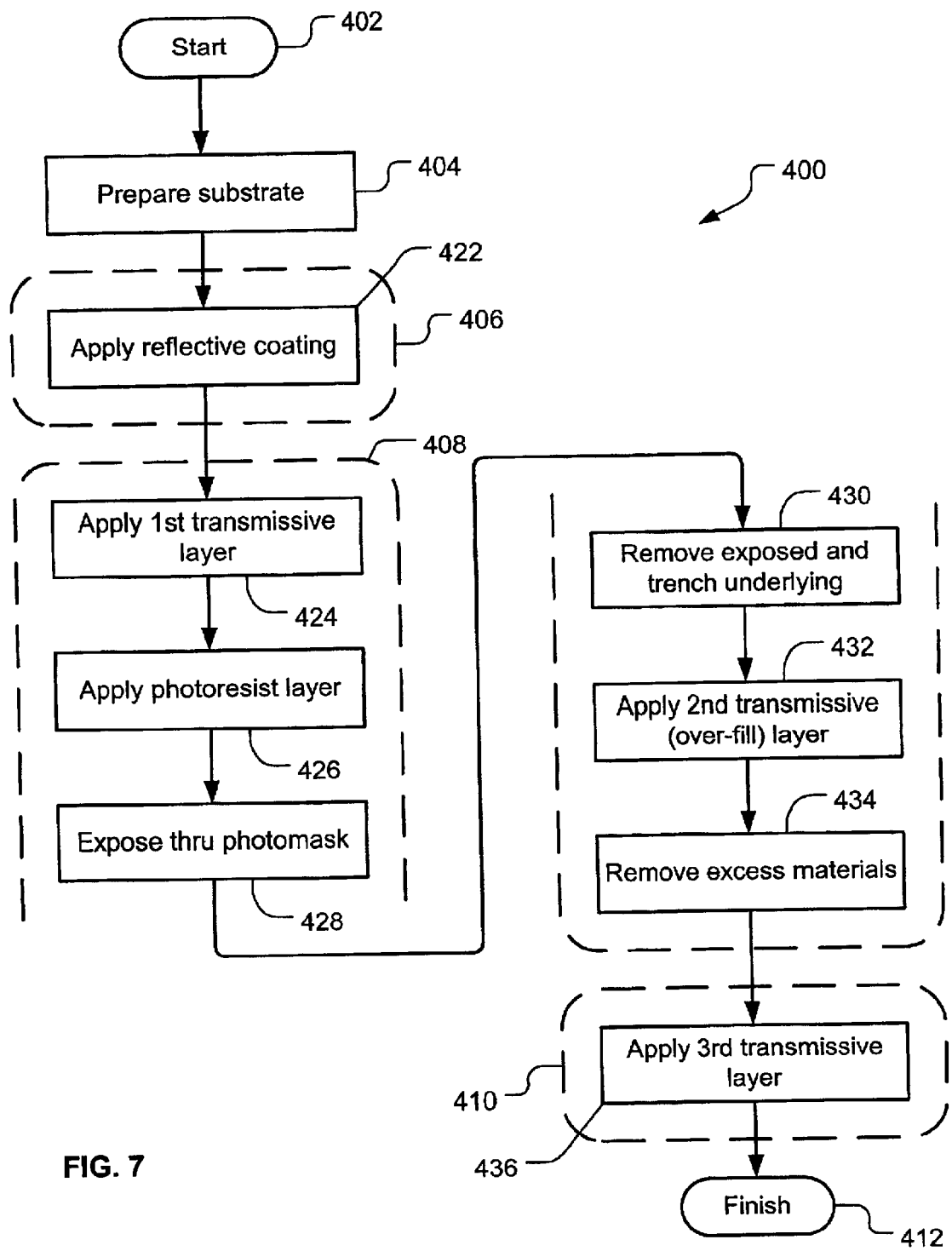
FIG. 7 is a flow chart showing application of the process to create the embodiment of the Bragg grating of FIG. 2.

FIG. 7 is a flow chart showing application of the process 400 to create the Bragg grating 100 of FIG. 2. The conventional or straightforward step 402 (start) and step 404 (substrate preparation) again occur. The step 406 (constructing a lower reflective means) here includes a single sub-step 422 for providing a reflective layer, such as a metallic coating, onto the (substrate) workpiece.

The step 408 (constructing the grating region and interlayer) here includes a number of sub-steps. The first of these is a sub-step 424 to provide a first transmissive layer on the workpiece, atop the reflective layer. In a sub-step 426 a first photoresist layer is then provided on the workpiece, atop the first transmissive layer. In a sub-step 428 the workpiece is exposed under a photomask. The photomask particularly has a pattern as already described e.g., for a simple Bragg grating a pattern interspaced by one-quarter of the wavelength (or by an odd numbered multiple of (hat) of the light which will be filtered.

In a sub-step 430 the exposed portions of the first photoresist layer are removed. Underlying portions of the first transmissive layer are also removed to a desired depth.

In a sub-step 432 a second transmissive layer is applied to the workpiece, atop the unetched portions of the first photoresist layer and filling in the first transmissive layer. The second transmissive layer particularly has a different index of refraction than the first transmissive layer.

In a sub-step 434 excess material, that is the upper most material here, is removed from the workpiece. Specifically, the second transmissive layer and unetched portions of the first photoresist layer are removed to a depth at least flush with the top most portions of the first transmissive layer. This completes the step 408 (grating region and interlayer construction).

The step 410 (constructing the upper reflective means) here includes a single sub-step 436 for providing a third transmissive layer on the workpiece, atop the remaining first and second transmissive layer portions. This third transmissive layer has the same index of refraction as the first or second transmissive layer. In a final step 412 the process 400 is now finished.

Figure 8:
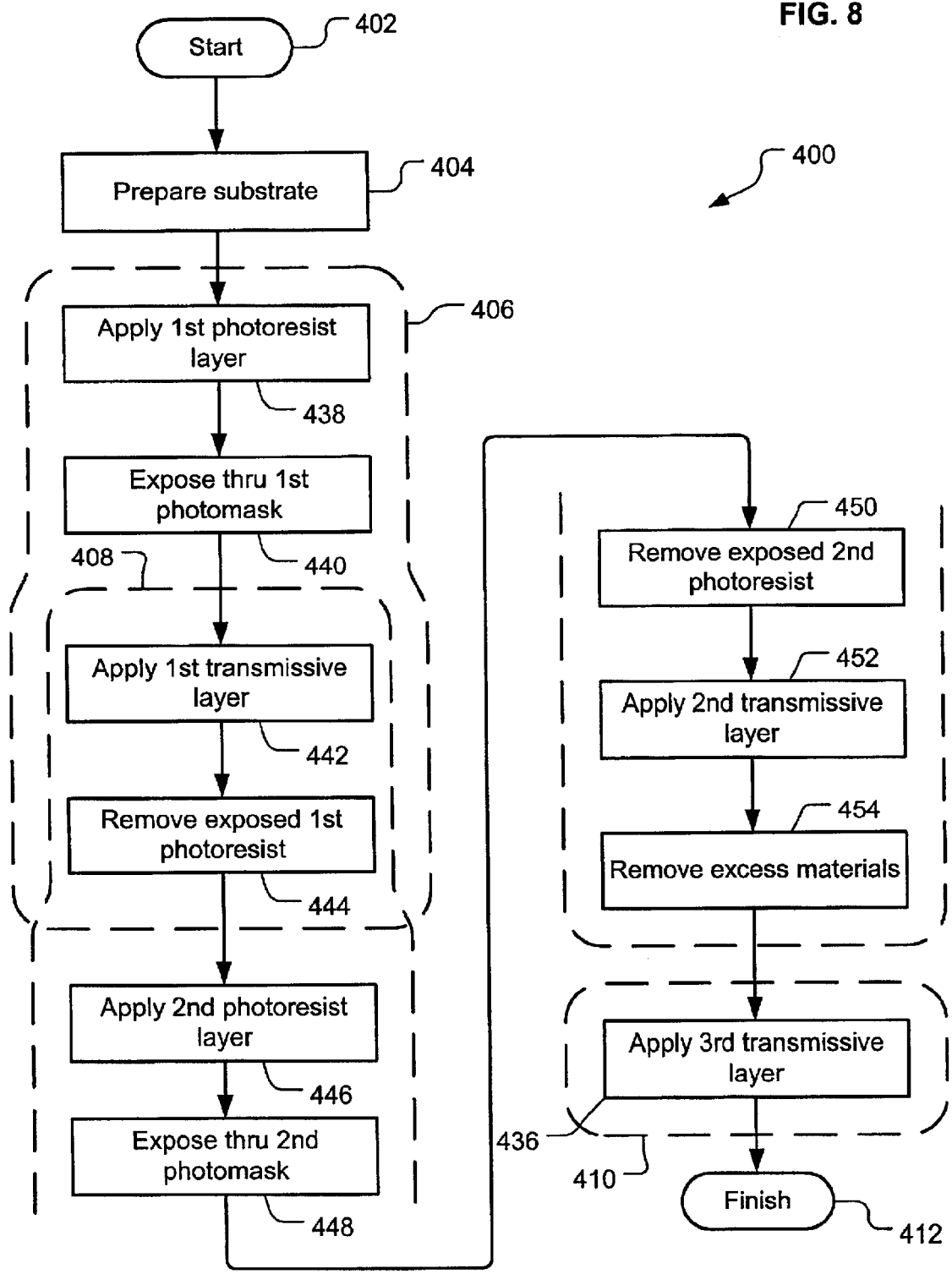
FIG. 8 is a flow chart showing application of the process to create the embodiment of the Bragg grating of FIGS. 4a–b.

FIG. 8 is a flow chart showing application of the process 400 to create the Bragg grating 100 of FIGS. 4a–b. The conventional or straightforward step 402 (start) and step 404 (substrate preparation) again occur.

The step 406 (constructing a lower reflective means) here includes a number of sub-steps. The first of these is a sub-step 438 to provide a first photoresist layer on the (substrate) workpiece. In a sub-step 440 the workpiece is exposed under a first photomask. In a sub-step 442 a first transmissive layer is provided on the workpiece, atop the first photoresist layer. In a sub-step 444 the exposed portion of the first photoresist layer is removed, leaving an air gap between the substrate and the first transmissive layer.

The step 408 (constructing the grating region and interlayer) here also includes a number of sub-steps. In fact, in this variation on the process 400 the sub-steps 442, 444 are part of both step 406 and step 408. The rest of the step 408 continues with a sub-step 446 where a second photoresist layer is applied to the workpiece, atop the first transmissive layer. In a sub-step 448 the workpiece is exposed under a second photomask having a suitable pattern.

In a sub-step 450 the exposed portions of the second photoresist layer and the underlying first transmissive layer are removed to a desired depth. This leaves an array of openings or trenches.

In a sub-step 452 a second transmissive layer is applied to the workpiece, atop the unetched portions of the second photoresist layer and filling in the trench array in the first transmissive layer. This second transmissive layer has a different index of refraction than the first transmissive layer.

In a sub-step 454 the upper most material, specifically the second transmissive layer and unetched portions of the second photoresist layer, is removed to a depth at least flush with the top most portions of the first transmissive layer. This completes the step 408 (grating region and interlayer construction).

The step 410 (constructing the upper reflective means) here includes the single sub-step 436 for providing a third transmissive layer on the workpiece, atop the remaining first and second transmissive layer portions. This can be essentially the same as the step 410 and sub-step 436 of FIG. 7. In a final step 412 the process 400 is now finished.

FIG. 9 is a flow chart showing application of the process 400 to create the Bragg grating 100 of FIGS. 5a–b. The conventional or straightforward step 402 (start) and step 404 (substrate preparation) again occur.

The step 406 (constructing a lower reflective means) here may be viewed as a variation of the approach used for step 410 in FIG. 7 and FIG. 8, or as a variation of the approach used for step 406 FIG. 8. A lower reflector is formed by the interface of the material of the substrate with air or another material below the substrate. As discussed, below, the grating region need not extend all the way down and through the substrate, and the excess material in the substrate thus can serve as part of the lower reflector. In this regard, step 404 and step 406 are essentially merged. Alternately, a reflective material can be applied, similar to the reflective coating used in sub-step 422 in FIG. 7.

The step 408 (constructing the grating region and interlayer) here includes a number of sub-steps. The first of these is a sub-step 456 to dope a portion of the substrate (or a first transmissive layer atop a substrate) which will ultimately become the grating region with an impurity. In a sub-step 458 a mask is constructed on the workpiece, atop the grating region. In a sub-step 460 an additional or other impurity is doped into the non-masked portions of the grating region. In a sub-step 462 the mask is removed.

The step 410 (constructing the upper reflective means) here may include the approach shown in FIG. 7 for step 406, using sub-step 422, or it may include the approach shown in FIG. 7 and FIG. 8 for step 408, using sub-step 436. Finally, in a step 412 the process 400 is finished.

With reference back to the earlier figures, more than two transmissive materials can be placed into the path a light beam will encounter. In FIG. 4b two materials having two indexes of refraction are present in the transmissive layer 214 and in the interlayer array 230. In FIG. 5b, the substrate 302 is one material having one index of refraction, and the interlayer array 310 is effectively of two other materials (after it is doped or has impurity diffused into it). Even variations on the inventive Bragg grating 100 like those in FIG. 2, FIGS. 4a–b, and FIGS. 5a–b are simple ones. It is a straightforward extension of the invention to use multiple materials (actual different materials or effectively so by treatment to change the indexes of refraction). One reason to do this is to handle multiple frequencies in a light beam, or to broaden the bandwidth of the frequencies filtered. Similarly, the spacing of the regions in the interlayers 110, 230, 310 can be changed to do this, much in the manner of periodically "chirped" prior art Bragg gratings.

Figure 10:
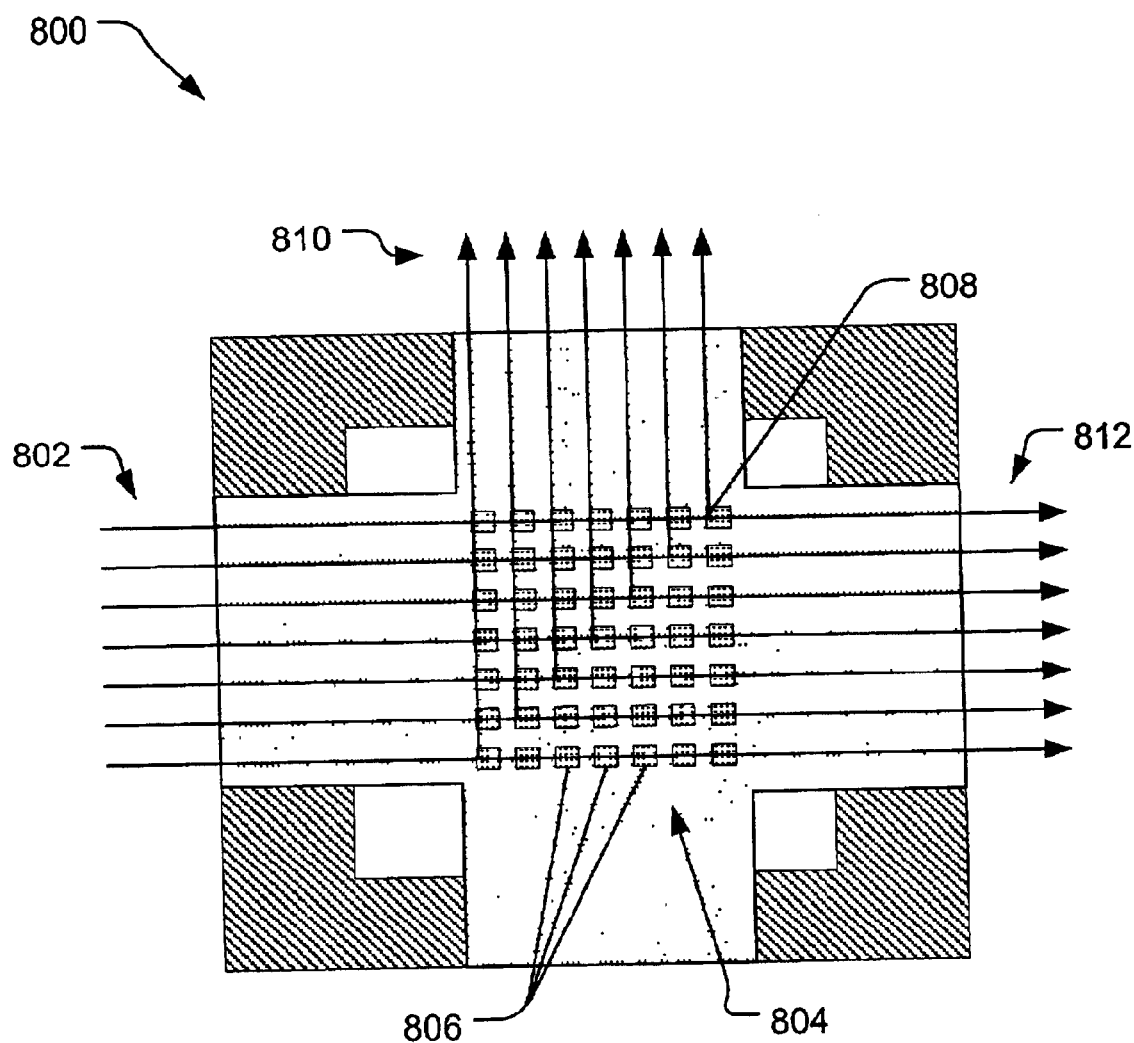
FIG. 10 is a top plan view of a two dimensional grating according to the present invention, including a stylized depiction of a laser beam traveling through the 2D grating.

FIG. 10 is a top plan view of a two dimensional (2D grating 800) according to the present invention, including a stylized depiction of a laser beam 802 traveling through a grating region 804 having a number of cells 806 forming an interlayer lattice 808. It should be noted that FIG. 10 is necessarily stylized. The number of the cells 806 in the interlayer lattice 808 will typically be much greater and their size will typically be much smaller. The arrangement and shape of the cells 806 is also not necessarily that shown. A salient point, however, is that the grating region 804 of the 2D grating 800 has a lattice of perturbations rather than a spaced apart array of linear perturbations extending across the grating region, unlike the one-dimensional Bragg grating 100 depicted in FIGS. 2–9. The grating region 804 is thus optically is a two dimensional extension of an one dimensional grating region.

The interlayer lattice 808 of the 2D grating 800 may be constructed such that the grating region 804 employs the Bragg effect, as is the case shown in FIG. 10. The interlayer lattice 808 can be oriented such that the laser beam 802 enters it at an incident angle substantially away from normal. Accordingly, a reflected beam 810 and a passed beam 812 may follow the paths depicted. The reflected beam 810 will contain light of a wavelength defined by the lattice structure of the cells 806 and the passed beam 812 will contain light of other wavelengths.

As those skilled in the art will appreciate, multi-dimensional gratings such as the 2D grating 800 here have simply not been possible using the optical fiber-based prior art. This concept of a two-dimension lattice region is also readily extendible further to a three-dimension region, by the simple use of multiple iterations of steps in the manufacturing process 400, discussed above. Each axis of such a three dimensional (3D) lattice may particularly be designed to present a different effective optical characteristic. For instance, a 3D Bragg grating may be constructed wherein an entering laser beam produces a first reflected beam, according to a first optical characteristic of the 3D lattice, and a second reflected beam of different wavelength, according to a second optical characteristic of the 3D lattice.

It should now also be noted that the examples in the figures herein have shown a single grating and no external components. There will, of course, be conventional external components such as a laser light source, and typically much more. Furthermore, however, in suitable applications considerable benefit can be obtained by using multiple gratings and other components together. One of the particular strengths of micro fabrication type processes, as used by the present invention, is that they can be used to construct large numbers and varieties of components concurrently. Such products can then be used either in operational combination or separately. Thus, for example, multiple Bragg gratings 100 or 2D gratings 800 can be constructed together in a linear or other operational arrangement, using different lattice dimensions, doping, etc. to work with different light wavelengths. If desired, other electrical and micromechanical components can also be constructed in the same substrate or in the same layer materials, e.g., one or more electro-optical sensors or micro mirrors. The present invention is thus very highly integrateable with IC and MEMS technology.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

INDUSTRIAL APPLICABILITY

The present inventive process is well suited for application in the production of optical gratings. The products of the invention may, optionally, be Bragg type gratings. The products of the invention may also be single- or multi-dimensional optical gratings, with the latter being particularly novel and exhibiting potential for application in manners heretofore not possible in the art.

The inventive process uses micro fabrication process such as photolithography, etching, thin film deposition, doping, stripping, thermal annealing, chemical mechanical polishing (CMP), planarization, etc., which are common in the production of electronic integrated circuits and micro electromechanical systems, to now also produce optical gratings in or atop substrate materials such as glass plate or silicon wafer. As such, the invention may provide the many benefits of such generally accepted technology in a field where such are highly desired. The invention provides a marked departure from most fiber-based optical grating technology known today, and particularly from conventional Bragg grating technology.

For the above, and other reasons, it is expected that the process and products of the present invention will have widespread industrial applicability. Therefore, it is expected that the commercial utility of the present invention will be extensive and long lasting.

What is claimed is:

1. A method for fabricating an optical grating, the method comprising the steps of:
   (a) providing a substrate;
   (b) providing a layer of transmissive material;
   (c) providing a first reflector, below said layer of transmissive material;
   (d) providing a grating region in said layer of transmissive material; and
   (e) providing a second reflector, above said layer of transmissive material, and
   wherein said first reflector, said grating region, and said second reflector are disposed to receive and contain light between said first reflector and said second reflector and to receive said light substantially normal to said grating region and to conduct said light within the plane of said transmissive material.

2. The method of claim 1, wherein said substrate is a member of the set of materials consisting of silicon wafer, GaAs, and glass.

3. The method of claim 1, wherein said layer of transmissive material is integral with said substrate.

4. An optical grating manufactured according to the method of claim 3.

5. The method of claim 1, wherein said layer of transmissive material is distinct from said substrate, thereby permitting said substrate to serve as a foundation for the rest of the optical grating.

6. An optical grating manufactured according to the method of claim 5.

7. The method of claim 1, wherein said layer of transmissive material is a member of the set of materials consisting of Si, SiO2, Al2O3, and MgF2.

8. The method of claim 1, wherein said layer of transmissive material is a member of the set of materials consisting of B, P, ZnSe, ZnS, GaP, SrTiO3, Si, Ge, InSb, YSZ, AlAs, BaTiO3, BiSiO20, Bi12GeO20, AlN, BN, AgGaS2, LiTaO3, CuCaS2, TlI, TlCl, TlBr, AgCl, AgBr, AgI, AgGaSe2, and KnbO3.

9. The method of claim 1, wherein at least one of said first reflector and said second reflector is a metallic material.

10. The method of claim 9, wherein at least one of said first reflector and said second reflector includes a coating of a member of the set consisting of Cu, Ag, Al, and Au.

11. The method of claim 1, wherein said transmissive material is a first transmissive material and at least one of said first reflector and said second reflector includes a second transmissive material having a refractive index different from that of said first transmissive material, thereby permitting reflection of light at the interface between said first transmissive material and said second transmissive material.

12. The method of claim 11, wherein second transmissive material is a gas in an environment surrounding the optical grating.

13. The method of claim 1, wherein said transmissive material is a first transmissive material and said step (d) includes:
   (1) forming a plurality of open cavities in said first transmissive material; and
   (2) filling said open cavities with a second transmissive material, wherein said first transmissive material and said second transmissive material have different refractive indexes, thereby permitting partial reflection of light at the interfaces between said first transmissive material and said second transmissive material.

14. The method of claim 13, wherein said open cavities form a linear array.

15. The method of claim 13, wherein said open cavities form a cell lattice.

16. The method of claim 13, wherein said step (1) includes:
   (i) masking said first transmissive material to define a protective pattern; and
   (ii) removing portions of said first transmissive material not protected by said protective pattern, thereby forming said plurality of open cavities.

17. The method of claim 13, wherein said step (1) includes spacing said plurality of open cavities based on multiples of one-quarter of one or more pre-determined light wavelengths, thereby causing the optical grating to be a Bragg grating.

18. A Bragg grating manufactured according to the method of claim 17.

19. The method of claim 1, wherein said step (d) includes:
   (1) masking said transmissive material to define a protective pattern; and (2) diffusing an impurity into portions of said transmissive material not protected by said protective pattern, thereby forming a plurality of doped regions.

20. The method of claim 19, wherein said plurality of doped regions form a liner array.

21. The method of claim 19, wherein said plurality of doped regions form a cell lattice.

22. The method of claim 19, wherein said step (1) includes defining said protective pattern such that said plurality of doped regions is spaced apart based on multiples of one-quarter of one or more pre-determined light wavelengths, thereby causing the optical grating to be a Bragg grating.

23. A Bragg grating manufactured according to the method of claim 22.

24. An optical grating manufactured according to the method of claim 1.

* * * * *